United States Patent
Miyazaki et al.

(10) Patent No.: US 12,130,536 B2
(45) Date of Patent: Oct. 29, 2024

(54) OPTICAL MODULATOR

(71) Applicant: SUMITOMO OSAKA CEMENT CO., LTD., Tokyo (JP)

(72) Inventors: Norikazu Miyazaki, Tokyo (JP); Kosuke Okahashi, Tokyo (JP); Masayuki Motoya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 324 days.

(21) Appl. No.: 17/599,491

(22) PCT Filed: Aug. 15, 2019

(86) PCT No.: PCT/JP2019/032007
§ 371 (c)(1),
(2) Date: Sep. 28, 2021

(87) PCT Pub. No.: WO2020/202596
PCT Pub. Date: Oct. 8, 2020

(65) Prior Publication Data
US 2022/0146901 A1    May 12, 2022

(30) Foreign Application Priority Data
Mar. 29, 2019   (JP) .................................. 2019-067717

(51) Int. Cl.
*G02F 1/21*    (2006.01)
*G02F 1/225*    (2006.01)

(52) U.S. Cl.
CPC .............. *G02F 1/212* (2021.01); *G02F 1/2255* (2013.01)

(58) Field of Classification Search
CPC ............................. G02F 1/212; G02F 1/12255
See application file for complete search history.

(56) References Cited

U.S. PATENT DOCUMENTS 11,287,720 B2 *  3/2022  Hayashi ............... G02F 1/2255
11,940,708 B2 *  3/2024  Miyazaki ............... G02F 1/035
(Continued)

FOREIGN PATENT DOCUMENTS

JP     1990291518      12/1990
JP     1999266105 A    9/1999
(Continued)

OTHER PUBLICATIONS

Japan Patent Office, International Search Report, PCT/JP2019/032007, Oct. 8, 2019.

*Primary Examiner* — Tina M Wong
(74) *Attorney, Agent, or Firm* — IpHorgan Ltd.

(57) ABSTRACT

To provide an optical modulator in which a plurality of Mach-Zehnder type optical waveguides are integrated, which can be driven at a low voltage, and in which the occurrence of a crosstalk phenomenon is suppressed. Provided is an optical modulator including a substrate 1 having an electro-optic effect, and an optical waveguide 10 and a control electrode that are formed on the substrate, in which the optical waveguide has a structure in which a plurality of Mach-Zehnder type optical waveguides are disposed in parallel, the control electrode has a GSSG type differential electrode structure in which two signal electrodes S are disposed between two ground electrodes G for one of the Mach-Zehnder type optical waveguides, and a crosstalk suppressing unit that suppresses signal crosstalk is provided in the ground electrode sandwiched between adjacent Mach-Zehnder type optical waveguides, so that optical modulator can be driven at a low voltage, and in which the occurrence of a crosstalk phenomenon is suppressed.

4 Claims, 5 Drawing Sheets

(56) References Cited

U.S. PATENT DOCUMENTS

2016/0033848 A1 2/2016 Sumitomo
2020/0041824 A1* 2/2020 Ohmori .................. G02F 1/035

FOREIGN PATENT DOCUMENTS

| JP | 2012163840 A | 8/2012 |
| JP | 2014191095 A | 10/2014 |
| JP | 2017142487 A | 8/2017 |
| JP | 200056282 A | 2/2020 |

* cited by examiner

OPTICAL MODULATOR

CROSS REFERENCE TO RELATED APPLICATIONS

This application is a national stage completion application of PCT Application No. PCT/JP2019/032007, filed Aug. 15, 2019, and claims priority from Japanese Patent Application No. 2019-067717, filed Mar. 29, 2019. Each of these applications is incorporated by reference herein in its entirety.

TECHNICAL FIELD

The present invention relates to an optical modulator, in particular, an optical modulator having a GSSG type differential electrode structure in which a plurality of Mach-Zehnder type optical waveguides are disposed in parallel, and two signal electrodes S are disposed between two ground electrodes G for one Mach-Zehnder type optical waveguide.

BACKGROUND ART

In recent years, the need for high speed and miniaturization of optical modulators has increased. Therefore, it has been studied to directly drive the modulator with the output signal of a digital signal processor (DSP) that is a signal processing element, or to incorporate a driver element for signal amplification into the case of the optical modulator.

For the output of the DSP and the driver element, a differential output configuration is used in order to suppress the influence of external noise during line transmission or to enable operation at a low voltage. So far, in an optical modulator using a crystal (EO crystal) having an electro-optic effect such as lithium niobate (LN), optical modulation using a differential signal is performed, by using a GSGSG type electrode structure in which ground electrodes G are disposed on both sides of two signal electrodes S for one Mach-Zehnder type optical waveguide, as illustrated in Patent Literature No. 1.

As an electrode arrangement for applying a differential signal, as illustrated in Patent Literature No. 2, a so-called GSSG type electrode structure has been proposed in which one Mach-Zehnder type optical waveguide is formed on an LN substrate, a signal electrode is disposed on each branched waveguide of the Mach-Zehnder type optical waveguide, and the ground electrode is disposed in the vicinity of each signal electrode on the outside of the optical waveguide. Further, Patent Literature No. 3 has proposed a GSSG type electrode structure using a differential electrical signal, in a semiconductor type phase modulator.

On the other hand, in coherent communication modulators or the like, an optical modulator in which a plurality of Mach-Zehnder type optical waveguide are integrated is used, such as a nest type optical waveguide in which a plurality of Mach-Zehnder type optical waveguides are nested. In the GSGSG type electrode structure in the related art, the number of electrodes is large, which makes it difficult to design the line layout.

In the integrated optical modulator, the clearance between the electrodes of the Mach-Zehnder type optical waveguides is narrowed, and the crosstalk phenomenon of the modulation signal between the adjacent optical modulator units is likely to occur. Moreover, as the modulation speed increases, the occurrence of the crosstalk phenomenon is more remarkable, and the quality deterioration of the modulation output becomes a big problem.

An effective method for suppressing the crosstalk phenomenon is to widen the signal interval between the adjacent optical modulator units and widen the ground electrode width between the signal electrodes, but for these purposes, it is necessary to widen the clearance between the optical waveguides, the length required for bending of the optical waveguide such as a branching portion becomes long, and not only the size of the optical modulator itself becomes large, but also the increase in optical loss due to the bending cannot be ignored.

[0008]

When a GSSG type electrode structure is adopted in order to reduce the number of electrodes, the clearance between the ground electrodes is wider as compared with the GSGSG type, so that the electric field easily leaks to the adjacent modulation units (action portions), and the crosstalk phenomenon is more likely to occur.

CITATION LIST

Patent Literature

[Patent Literature No. 1] Japanese Laid-open Patent Publication No. 2000-56282
[Patent Literature No. 2] Japanese Laid-open Patent Publication No. 2-291518
[Patent Literature No. 3] Japanese Laid-open Patent Publication No. 2017-142487

SUMMARY OF INVENTION

Technical Problem

In order to solve the above-described problems, there is provided an optical modulator in which a plurality of Mach-Zehnder type optical waveguides are integrated, which can be driven at a low voltage, and in which the occurrence of a crosstalk phenomenon is suppressed.

Solution to Problem

In order to solve the above problems, an optical modulator of the present invention has the following technical features.
 (1) An optical modulator includes a substrate having an electro-optic effect, and an optical waveguide and a control electrode that are formed on the substrate, in which the optical waveguide has a structure in which a plurality of Mach-Zehnder type optical waveguides are disposed in parallel, the control electrode has a GSSG type differential electrode structure in which two signal electrodes S are disposed between two ground electrodes G for one of the Mach-Zehnder type optical waveguides, and a crosstalk suppressing unit that suppresses signal crosstalk is provided in the ground electrode sandwiched between adjacent Mach-Zehnder type optical waveguides.
 (2) In the optical modulator according to (1) above, the crosstalk suppressing unit is set such that at least a part of upper surfaces of the ground electrodes is higher than upper surfaces of the signal electrodes, and at least a part of lower surfaces of the ground electrodes is lower than lower surfaces of the signal electrodes.

(3) In the optical modulator according to (2) above, in the ground electrode, a side surface portion facing the signal electrode is separated from a main body portion that is a portion excluding the side surface portion, and electrical connection is partially provided between the side surface portion and the main body portion, along an extending direction of the optical waveguide.

Advantageous Effects of Invention

According to the present invention, it is possible to provide an optical modulator including: a substrate having an electro-optic effect; and an optical waveguide and a control electrode that are formed on substrate, in which the optical waveguide has a structure in which a plurality of Mach-Zehnder type optical waveguides are disposed in parallel, and the control electrode has a GSSG type differential electrode structure in which two signal electrodes S are disposed between two ground electrodes G for one of the Mach-Zehnder type optical waveguides, in which a crosstalk suppressing unit that suppresses signal crosstalk is provided in the ground electrode sandwiched between adjacent Mach-Zehnder type optical waveguides, so that optical modulator can be driven at a low voltage, and in which the occurrence of a crosstalk phenomenon is suppressed.

DESCRIPTION OF EMBODIMENTS

Hereinafter, an optical modulator of the present invention will be described in detail with reference to suitable examples.

Figure 1:
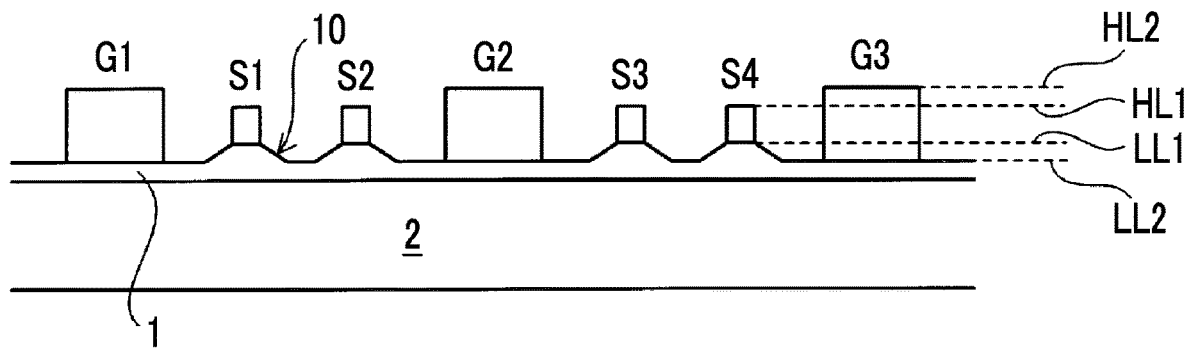
FIG. 1 is a diagram illustrating a first embodiment of an optical modulator of the present invention.

The optical modulator of the present invention is, as illustrated in FIG. 1, an optical modulator in which an optical waveguide 10 and a control electrode are formed on a substrate 1 having an electro-optic effect, the optical waveguide has a structure in which a plurality of Mach-Zehnder type optical waveguides are disposed in parallel, and the control electrode has a GSSG type differential electrode structure in which two signal electrodes S (S1 and S2 or S3 and S4) are disposed between two ground electrodes G (G1 and G2 or G2 and G3) for one of the Mach-Zehnder type optical waveguides, in which a crosstalk suppressing unit that suppresses signal crosstalk is provided in a ground electrode (G2) sandwiched between adjacent Mach-Zehnder type optical waveguides.

As the substrate having an electro-optic effect used in the present invention, a dielectric substrate of lithium niobate or the like, a resin substrate of EO polymer or the like, a semiconductor substrate, and the like can be used. In the case of a structure in which a waveguide is disposed below a signal electrode and using a dielectric substrate, a Z-cut substrate having the greatest electro-optic effect in the thickness direction of the substrate is preferred.

When as the substrate 1 having an electro-optic effect, for example, a thin plate of 20 μm or less, a holding substrate 2 is used in order to increase the mechanical strength. The holding substrate 2 is made of a material having a refractive index lower than that of the substrate 1 having an electro-optic effect, and is made of, for example, quartz, glass, resin, or the like.

The optical modulator of the present invention includes an optical waveguide in which a plurality of Mach-Zehnder type optical waveguide are disposed in parallel, such as a nest type optical waveguide, and FIG. 1 illustrates a cross-sectional view in which two adjacent Mach-Zehnder type optical waveguides are cut perpendicular to the traveling direction of a light wave. The raised portion (ridge portion) 10 of the substrate 1 under the signal electrodes S1 and S2 is two branched waveguides configuring the Mach-Zehnder type optical waveguide. Further, the ridge portion 10 under the signal electrodes S3 and S4 is a branched waveguide of an adjacent Mach-Zehnder type optical waveguide. The optical waveguide may be only a ridge portion formed on the substrate, but as will be described later, Ti is thermally diffused on the LN substrate to form an optical waveguide.

The control electrodes are formed by plating an electric conductor such as Au on a substrate, and include signal electrodes (S1 to S4) to which a modulation signal is applied, ground electrodes (G1 to G3), and a DC bias electrode for performing phase adjustment and drift control.

Figure 2:
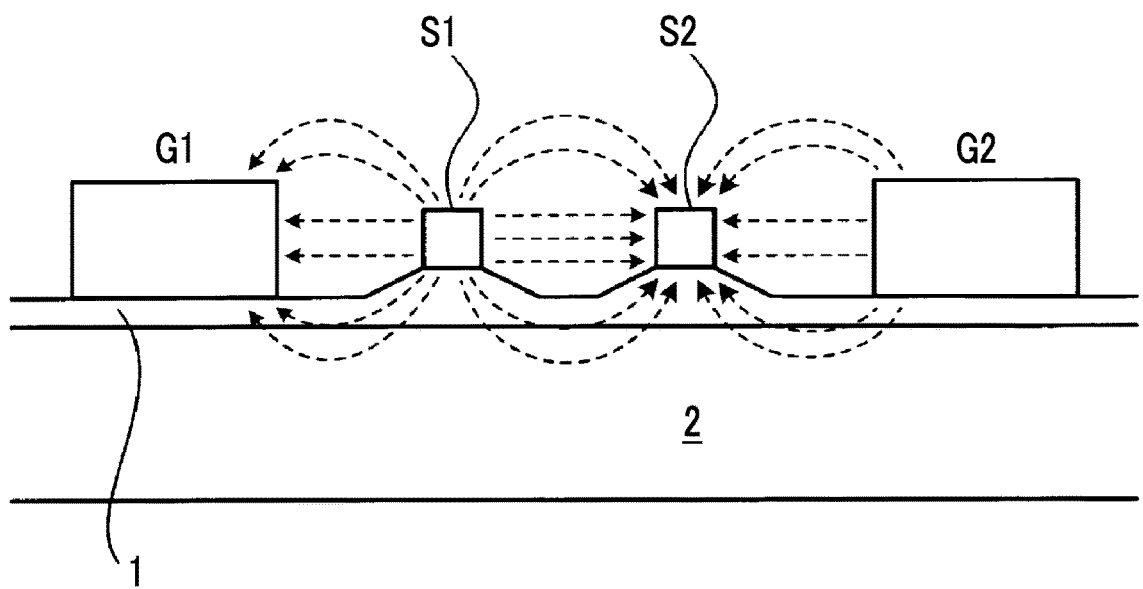
FIG. 2 is a diagram illustrating a state of distribution of lines of electric force in the optical modulator of FIG. 1.

A feature of the present invention is that the control electrode, particularly the signal electrode for applying a high-frequency modulation signal and the ground electrode, is provided with a GSSG type differential electrode structure. In the GSSG type in the related art as illustrated in Patent Literature No. 2, since the distance between the differential signal electrodes is large, the electric field generated between the adjacent signal electrode and the ground electrode when an electric field is applied to the optical waveguide is used exclusively. However, in the optical modulator of the present invention, as illustrated in FIG. 2, not only the electric field generated between the signal electrode and the ground electrode (between S1 and G1 or between S2 and G2) as in the case in the related art, but also the electric field between the signal electrodes (between S1 and S2) is used by reducing the distance between the differential signal electrodes. Rather, it actively utilizes the electric field between the signal electrodes. As illustrated in FIG. 2, since the strength of the electric field between the signal electrodes (between S1 and S2, the electric field due to the potential difference between the in-phase signal and the anti-phase signal of the differential signal) is higher than the strength of the electric field between the signal electrode and the ground electrode, it is possible to further enhance the effect of lowering the drive voltage by the differential signal.

Further, a feature of the present invention is that in order to suppress the occurrence of the crosstalk phenomenon that is a drawback of the GSSG type, a crosstalk suppressing unit that suppresses signal crosstalk is provided in the ground electrode sandwiched between the adjacent Mach-Zehnder type optical waveguides. As a specific configuration of the crosstalk suppressing unit, as illustrated in FIG. 1, the crosstalk suppressing unit is set such that at least a part of the upper surfaces (height HL2) of the ground electrodes (G1 to G3) are higher than the upper surfaces (height HL1) of the signal electrodes (S1 to S4), and at least a part of the lower surfaces (height LL2) of the ground electrodes are lower than the lower surfaces (height LL1) of the signal electrodes. In FIG. 1, for convenience, the heights are compared using the signal electrode S4 and the ground electrode G3, but the configuration also applies to the relationship between the signal electrodes (S1 and S2, or S3 and S4) and the ground electrode G2.

Figure 3:
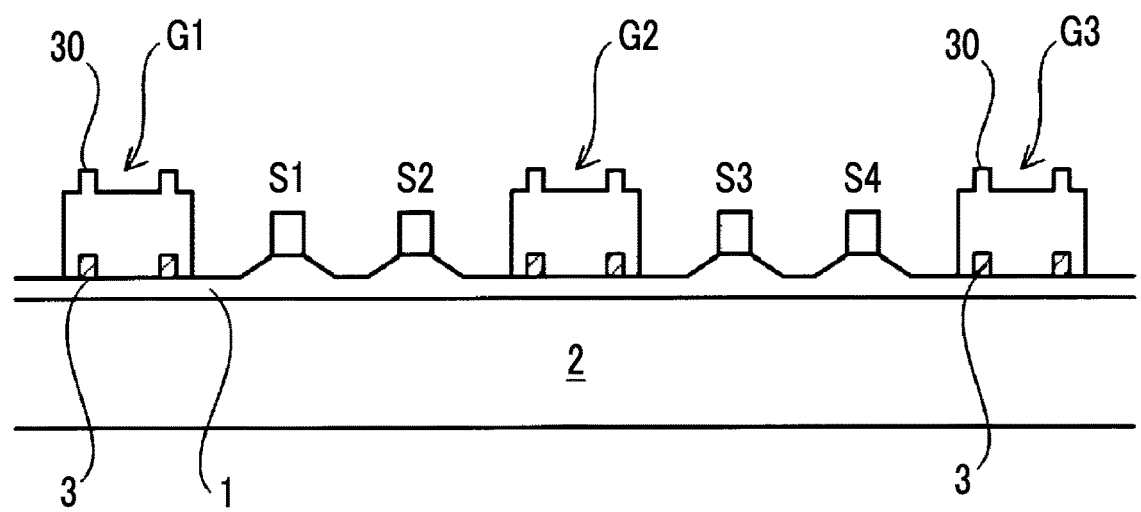
FIG. 3 is a diagram illustrating a second embodiment of the optical modulator of the present invention.
Figure 4:
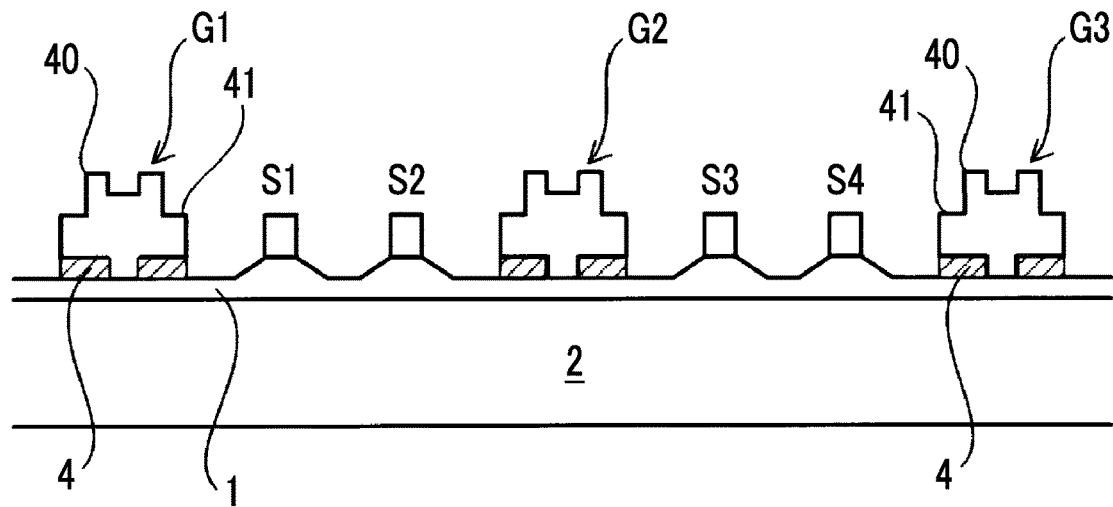
FIG. 4 is a diagram illustrating a third embodiment of the optical modulator of the present invention.

FIGS. 3 and 4 are other embodiments of the present invention, in which a high portion is locally formed on the upper surface of the ground electrode. In FIG. 3, when a resin layer 3 such as a photoresist made of either a thermoplastic resin or a thermosetting resin is used and the ground electrodes (G1 to G3) are laminated on the resin layer 3, a protrusion 30 is formed on the upper surface of the ground electrode corresponding to the resin layer 3. This protrusion 30 prevents the electric field related to crosstalk from straddling the ground electrode and reaching the adjacent Mach-Zehnder type optical waveguide or the adjacent signal electrode. It is possible to use a layer in which a dielectric (SiO2, or the like) is formed and patterned, instead of the resin layer, and it is more suitable in the present invention because when a photoresist is used, a relatively thick layer thicker (about 3 to 5 μm) than 1 μm can be easily formed. Moreover, the photoresist can be suitably used in the present invention because the pattern shape, thickness and the like can be easily and systematically controlled by the photolithography process.

In FIG. 4, the side surface portion 41 of the ground electrode where the electric field is concentrated between the signal electrodes (S1 to S4) and the ground electrodes (G1 to G3) is set at the same position as the signal electrode. In the other portion of the ground electrode, a portion higher than the upper surface of the signal electrode and a portion lower than the lower surface of the signal electrode are formed. It is also possible to use the resin layer 4 when forming the portions having different heights. As a matter of course, for the level difference that cannot be formed only by the resin layer 4, a method such as forming electrodes having different thicknesses in multiple steps is used.

Figure 5:
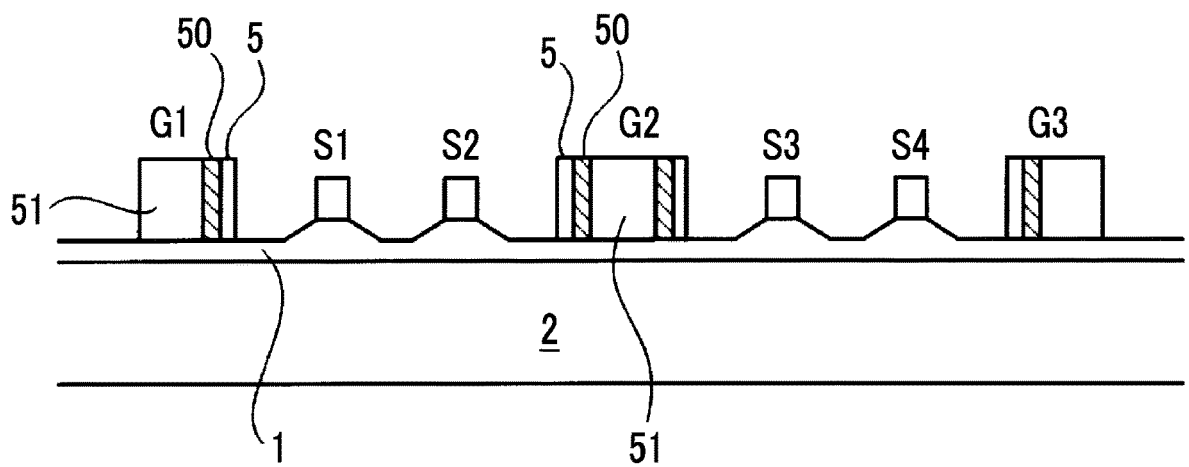
FIG. 5 is a diagram illustrating a fourth embodiment of the optical modulator of the present invention.
Figure 6:
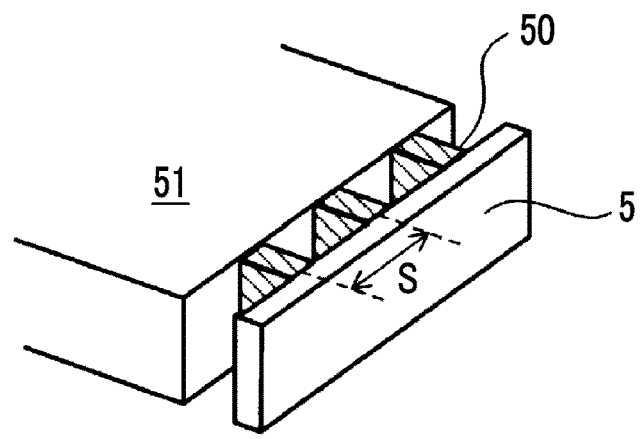
FIG. 6 is a diagram illustrating a connection structure between a side surface portion and a main body portion in a ground electrode in FIG. 5.
Figure 7:
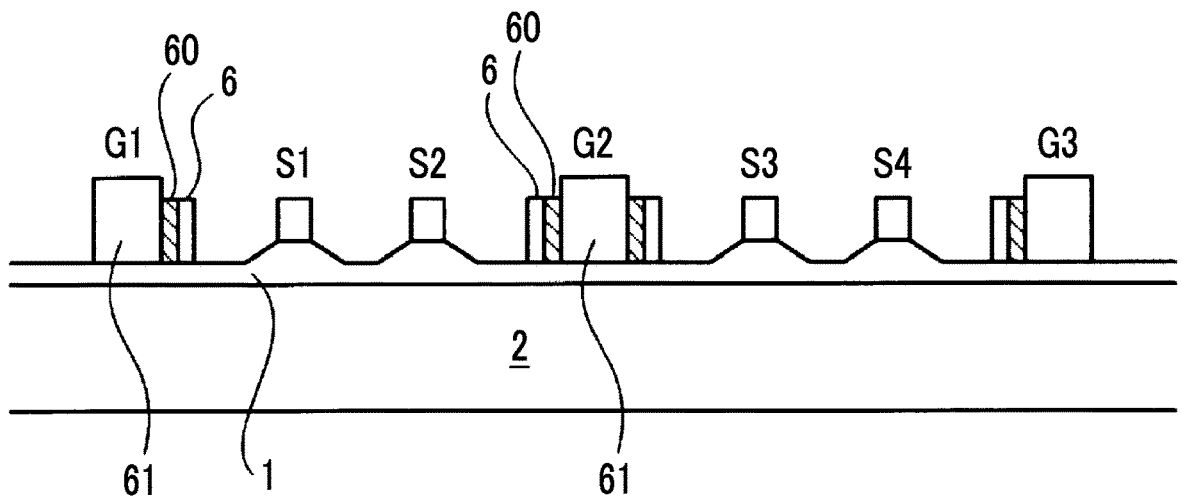
FIG. 7 is a diagram illustrating a fifth embodiment of the optical modulator of the present invention.

FIGS. 5 to 7 are other embodiments. In the ground electrodes (G1 to G3), the side surface portions (5, 6) facing the signal electrodes (S1 to S4) are separated from main body portions (51, 61) that are portions excluding the side surface portions, and electrical connection portions (50, 60) are partially provided between the side surface portions and the main body portions along the extending direction of the optical waveguide.

In FIG. 5, the side surface portion 5 and the main body portion 51 of the ground electrode are at the same height, but in FIG. 7, the side surface portion 6 where the electric field is concentrated between the signal electrode and the ground electrode is at the same height as the signal electrode, and the height of the main body portion 61 (the ground electrode portion outside the side surface portion 6 of interest) is set higher. In the configuration of FIG. 6, it suppresses the leakage of electric field beyond the ground electrode to the adjacent signal electrode to generate crosstalk.

In FIGS. 5 and 7, the connection portion (50, 60) that electrically connects the side surface portions (5, 6) and the main body portion (51, 61) of the ground electrode is partially disposed along the direction in which the side surface portion 5 extends (the optical waveguide extends). The connection portion 50 is made of the same material as the side surface portion and the main body portion, and can be integrally formed. The arrangement clearance of the connection portion 50 may be set to one-fourth or less, preferably about one-tenth of the wavelength of the microwave having a frequency equal to the modulation frequency or the modulation symbol rate used in the modulation signal.

Figure 8:
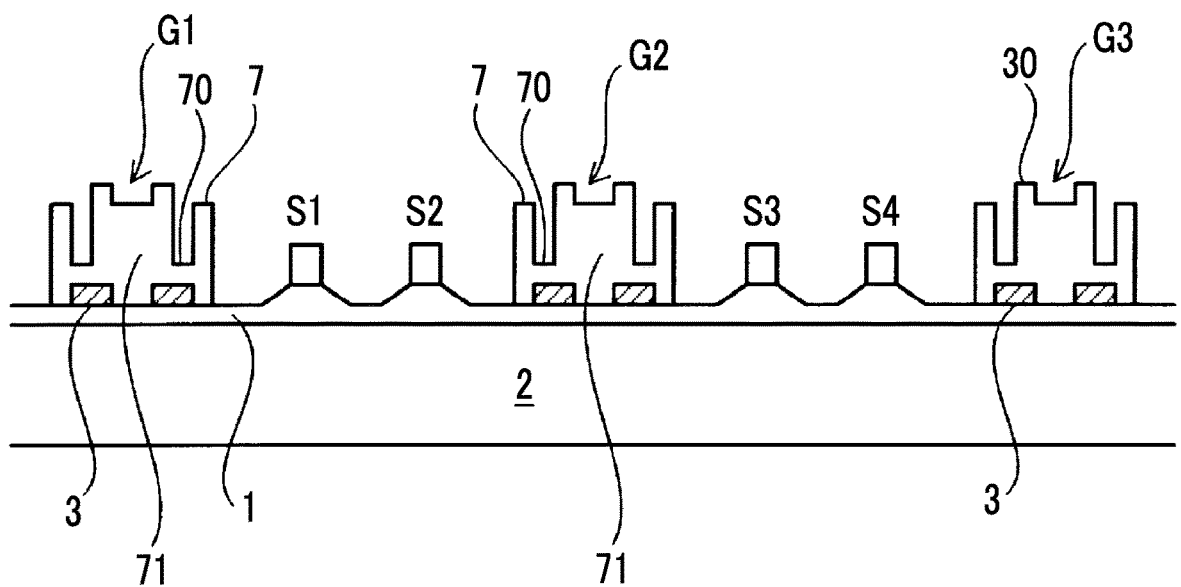
FIG. 8 is a diagram illustrating a sixth embodiment of the optical modulator of the present invention.

Further, as illustrated in FIG. 8, by patterning the electrodes a plurality of times to form electrodes having different thicknesses, the connection portion 70 may be formed to have a lower upper surface and a higher lower surface than the side surface portion 7, and may partially connect the main body portion 71 and the side surface portion 7.

Figure 9:
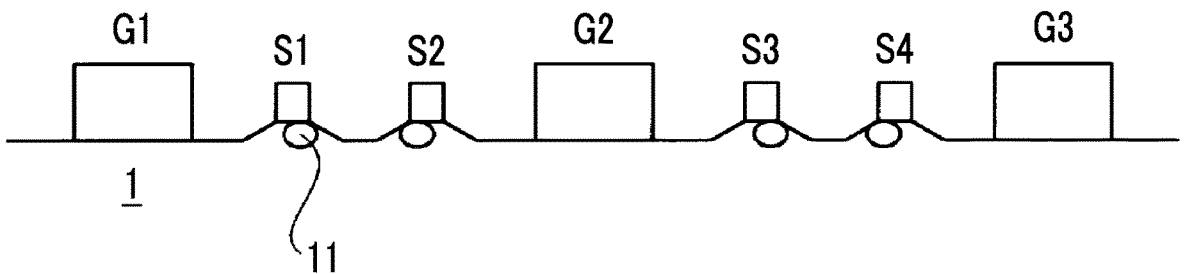
FIG. 9 is a diagram illustrating a seventh embodiment of the optical modulator of the present invention.
Figure 10:
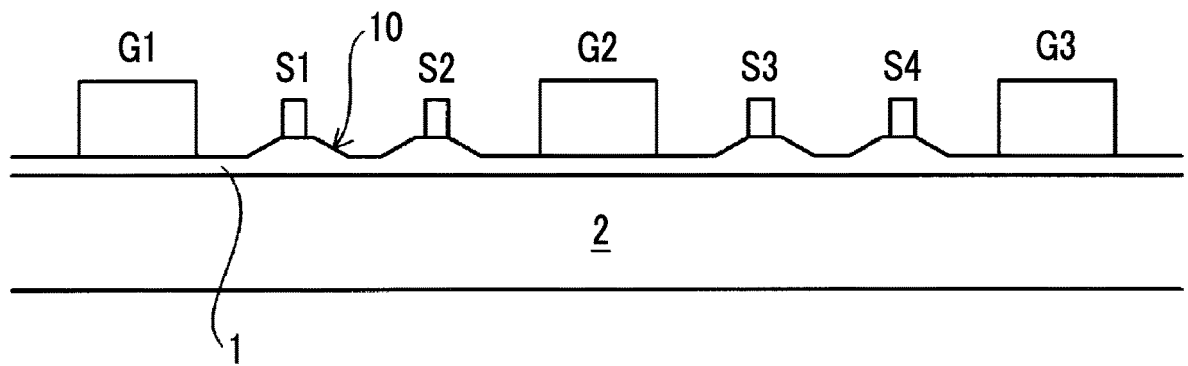
FIG. 10 is a diagram illustrating an eighth embodiment of the optical modulator of the present invention.

FIGS. 9 and 10 are other embodiments, and in the GSSG type differential electrode structure used in the optical modulator of the present invention, a stronger electric field is generated between signal electrodes (between S1 and S2, or between S3 and S4). By disposing the optical waveguide at this position, it is possible to efficiently perform optical modulation.

In FIG. 9, an optical waveguide 11, in which Ti or the like is thermally diffused, is formed on the ridge portion of the substrate 1, and the optical waveguide 11 is not formed directly below the signal electrodes (S1 to S4) but is formed at a position closer to the other signal electrodes than directly below the signal electrodes.

In FIG. 10, since the ridge portion 10 is an optical waveguide, the signal electrode S1 is disposed closer to the ground electrode G1 side and the signal electrode S2 is disposed closer to the ground electrode G2 side such that the ridge portion 10 is more exposed between the signal electrodes S1 and S2.

The thickness of the substrate in the ridge portion is about 2 to 4 μm, and the thickness of the substrate 1 excluding the ridge portion is set to 1 to 2 μm.

Figure 11:
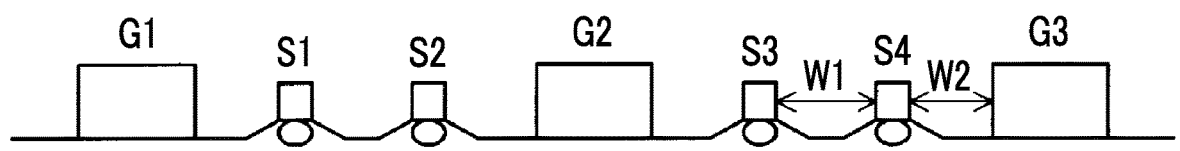
FIG. 11 is a diagram illustrating a relationship between a distance between signal electrodes and a distance between a signal electrode and a ground electrode, in the optical modulator of the present invention.

FIG. 11 is a diagram illustrating a relationship between a distance W1 between signal electrodes and a distance W2 between a signal electrode and a ground electrode, in the optical modulator of the present invention. It is assumed that a +V signal voltage is applied to the signal electrode S1 and a −V signal voltage is applied to the signal electrode S2. In this case, since the ground electrode has ±0, a potential difference V is generated between the signal electrode and the ground electrode (S1 and G1, S2 and G2). On the other hand, a potential difference 2V is generated between the signal electrodes (S1 and S2).

The optical modulator of the present invention is intended to effectively utilize the potential difference 2V between signal electrodes, and for this purpose, the distance W1 needs to be set to less than twice the distance W2.

Figure 12:
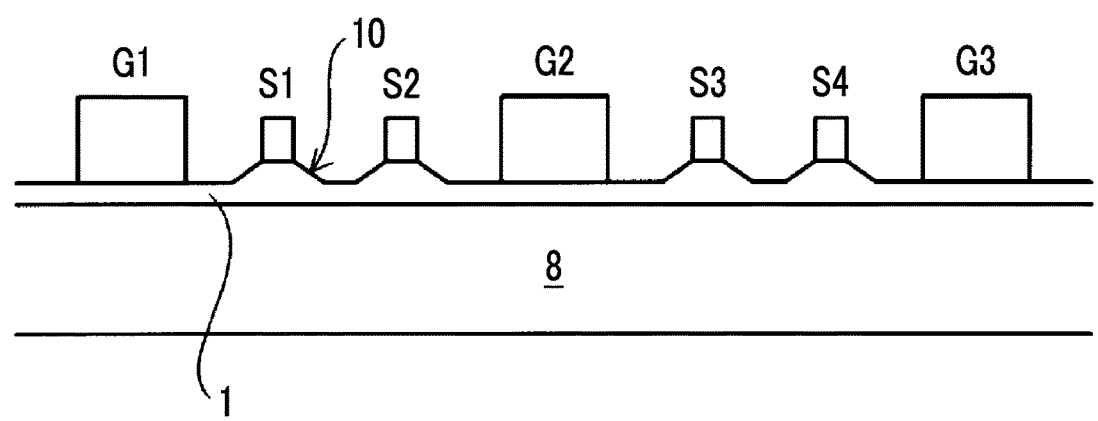
FIG. 12 is a diagram illustrating a ninth embodiment of the optical modulator of the present invention.
Figure 13:
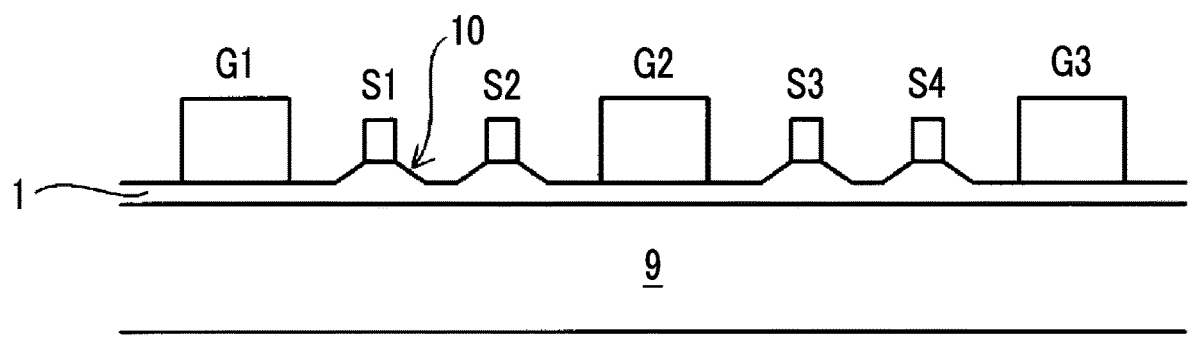
FIG. 13 is a diagram illustrating a tenth embodiment of the optical modulator of the present invention.

The above description is focused on an example in which the holding substrate 8 is used as illustrated in FIG. 12, but the substrate may be held by the holding substrate 80 via a low refractive index layer 9, as illustrated in FIG. 13. In this case, the holding substrate 80 does not need to have a lower refractive index than the substrate 1. Further, for the low refractive index layer, an adhesive such as a resin can be used.

INDUSTRIAL APPLICABILITY

As described above, according to the present invention, there is provided an optical modulator in which a plurality of Mach-Zehnder type optical waveguides are integrated, which can be driven at a low voltage, and in which the occurrence of a crosstalk phenomenon is suppressed.

REFERENCE SIGNS LIST 1 substrate with electro-optic effect
10 ridge portion (optical waveguide)
11 optical waveguide
2, 8 holding substrate (low refractive index material)
9 low refractive index layer
80 holding substrate
S1 to S4 signal electrode
G1 to G3 ground electrode

The invention claimed is:

1. An optical modulator comprising:
a substrate having an electro-optic effect; and
an optical waveguide and a control electrode that are formed on the substrate, wherein
the optical waveguide has a structure in which a plurality of Mach-Zehnder type optical waveguides are disposed in parallel,
the control electrode has a GSSG type differential electrode structure in which two signal electrodes S are disposed between two ground electrodes G for one of the Mach-Zehnder type optical waveguides,
a distance W1 between the two signal electrodes S is set to less than twice a distance W2 between the adjacent signal electrode S and the ground electrode G,
a crosstalk suppressing unit that suppresses signal crosstalk is provided in the ground electrode sandwiched between adjacent Mach-Zehnder type optical waveguides,
the crosstalk suppressing unit is a protrusion formed on an upper surface of the ground electrode corresponding to, or aligned with, a resin layer, the resin layer arranged between the ground electrode and the substrate, and
the protrusion is higher than the upper surface of the signal electrode.

2. The optical modulator according to claim 1, wherein the crosstalk suppressing unit is set such that at least a part of lower surfaces of the ground electrodes is lower than lower surfaces of the signal electrodes.

3. The optical modulator according to claim 2, wherein in the ground electrode, a side surface portion facing the signal electrode is separated from a main body portion that is a portion excluding the side surface portion, and electrical connection is partially provided between the side surface portion and the main body portion, along an extending direction of the optical waveguide.

4. The optical modulator according to claim 1, wherein the protrusion of the ground electrode is separated from a side surface portion of the ground electrode facing the signal electrode and is locally higher than the height of the side surface portion.

* * * * *